US008061954B2

(12) United States Patent  (10) Patent No.: US 8,061,954 B2
Lambright  (45) Date of Patent: Nov. 22, 2011

(54) CARGO DOOR/RAMP LIFT ASSIST SYSTEM

(75) Inventor: Michael Lambright, Goshen, IN (US)

(73) Assignee: Designed Components, LLC, Goshen, IN (US)

( * ) Notice: Subject to any disclaimer, the term of this patent is extended or adjusted under 35 U.S.C. 154(b) by 1011 days.

(21) Appl. No.: 11/619,321

(22) Filed: Jan. 3, 2007

(65) Prior Publication Data

US 2007/0183877 A1  Aug. 9, 2007

Related U.S. Application Data

(60) Provisional application No. 60/755,760, filed on Jan. 3, 2006.

(51) Int. Cl.
*B60P 1/00* (2006.01)
(52) U.S. Cl. .................. 414/537; 414/556; 414/557
(58) Field of Classification Search ............ 414/556, 414/557
See application file for complete search history.

(56) References Cited

U.S. PATENT DOCUMENTS

| | | | |
|---|---|---|---|
| 3,336,070 A | 8/1967 | Jackson | |
| 4,143,904 A | 3/1979 | Cooper et al. | |
| 5,358,301 A | 10/1994 | Konchan et al. | |
| 5,988,724 A | 11/1999 | Wolda | |
| 6,637,796 B1 | 10/2003 | Westerdale et al. | |
| 6,769,729 B1 | 8/2004 | Bruford et al. | |
| 6,793,263 B1 | 9/2004 | Bruford et al. | |
| 6,796,592 B1 | 9/2004 | Austin | |
| 6,846,030 B2 | 1/2005 | Koehler et al. | |
| 6,874,837 B2 | 4/2005 | Bruford et al. | |
| 6,905,156 B2 | 6/2005 | Miller et al. | |
| 2004/0178651 A1 | 9/2004 | Austin | |
| 2004/0262944 A1 * | 12/2004 | Koehler et al. | 296/146.11 |
| 2005/0194808 A1 | 9/2005 | Austin | |
| 2007/0262107 A1 * | 11/2007 | Brenneman et al. | 224/495 |

* cited by examiner

*Primary Examiner* — Saul Rodriguez
*Assistant Examiner* — Willie Berry, Jr.
(74) *Attorney, Agent, or Firm* — Brinks Hofer Gilson & Lione

(57) ABSTRACT

A lift assist system for cargo door ramps of trucks and trailers which includes one or more torsion arms that are housed in a tubular housing assembly attached at the pivotal axis of the door ramps. The housing assembly includes left and right door hinges and at least one center door hinge. Tubular housing members which house the torsion bars extend between the door hinges.

20 Claims, 7 Drawing Sheets

US 8,061,954 B2

CARGO DOOR/RAMP LIFT ASSIST SYSTEM

RELATED APPLICATION

This application is based upon U.S. Provisional Patent Application Ser. No. 60/755,760, filed Jan. 3, 2005 of which the entire disclosure is hereby incorporated by reference and to which priority is claimed under 35 U.S.C. §130.

TECHNICAL FIELD

The present invention relates to vehicles and trailers that carry various types of cargo that is typically loaded and unloaded with the use of a ramp. More particularly, the present invention is directed to a lift assist system for vehicles and trailers that have cargo doors that pivot downward and can function as loading/unloading ramps.

BACKGROUND ART

There are numerous vehicles that are used to haul cargo ranging from commercial fleets of trucks, step vans, panel trucks and the like to do-it-yourself rental trucks that consumers can rent to move or haul various items. In addition there are various types of trailers that are used to haul cargo ranging from semi trailers, to trailers that are used to haul recreational vehicles such as snowmobiles, all terrain vehicles (ATV), person watercraft, motorcycles and the like.

In many instances a ramp is used to load and unload cargo from such vehicles and trailers. Removable ramps are common and are either stored within the cargo compartment of the vehicle or trailed and unload for use and loaded after use. Some vehicles provide for ramps that are stored under the cargo compartment. In other instances, the rear or cargo door of the vehicles and trailers can be pivoted downward and used as a ramp; however, it can be difficult, especially in the case of large, heavy cargo doors, for an individual to lift the cargo door back into its closed position.

Lift assist systems have been developed extensively for pickup truck tailgates as exemplified by U.S. Pat. No. 3,336,070 to Jackson, U.S. Pat. No. 4,143,904 to Cooper et al., U.S. Pat. No. 5,358,301 to Konchan et al., U.S. Pat. No. 5,988,724 to Wolda, U.S. Pat. No. 6,637,796 to Westerdale et al., U.S. Pat. No. 6,769,729 to Bruford et al., U.S. Pat. No. 6,793,263 to Bruford et al., U.S. Pat. No. 6,796,592 to Austin, U.S. Pat. No. 6,846,030 to Koehler et al., U.S. Pat. No. 6,874,837 to Bruford et al., and U.S. Pat. No. 6,905,156 to Miller et al. and U.S. Patent Application Publication Nos. 2004/0178651 to Austin and 2005/0194808 to Austin.

Lift assist systems that have been designed and developed for pickup tailgates are generally not suitable or adaptable for used in conjunction with ramps that are used in conjunction with cargo vehicles and trailers. In this regard, pickup truck tailgates are generally hollow which allows for the lift assist systems to be housed therein, dimensionally constrained only by the cavity within the hollow tailgates. In addition, pickup tailgates are relatively short, perhaps being only about two feet tall so there is not much of a moment arm about the axis of pivot of a tailgate. Also, pickup truck tailgates are only pivoted about 90 degrees between a vertical position and a horizontal position (in which they are supported by various linkage brackets).

The present invention provides for lift assist systems for use with door ramps of trucks and trailers which allows the free end of the door ramps of such vehicles and trailers to move assisted between a vertical position and an inclined position between which positions the door ramps pivots through a obtuse angle of greater than 90 degrees so that the free end of the door ramp rests on the ground.

DISCLOSURE OF THE INVENTION

According to various features, characteristics and embodiments of the present invention which will become apparent as the description thereof proceeds, the present invention provides a lift assist system for a cargo door ramp that includes:

at least one torsion bar that has one end fixed against axial rotation relative to the door ramp and an opposite end fixed against axial rotation relative to a structure about which the door ramp pivots between an open and closed position;

a plurality of door hinges including at least left and right door hinges and at least one center door hinge; and a tubular housing extending between the door hinges through which the at least one torsion bar extends.

The present invention further provides a vehicle having a door that pivots adjacent a frame downward into an open position and upward into a closed position in combination with a lift assist system which combination includes:

at least one torsion bar that has one end fixed against axial rotation relative to the door ramp and an opposite end fixed against axial rotation relative to a portion of the frame adjacent which the door pivots between the open and closed positions;

a plurality of door hinges attached to the door, including at least left and right door hinges and at least one center door hinge; and a tubular housing extending between the door hinges through which the at least one torsion bar extends, the tubular housing being attached to the frame.

BRIEF DESCRIPTION OF DRAWINGS

The present invention will be described with reference to the attached drawings which are given as non-limiting examples only, in which.

BEST MODE FOR CARRYING OUT THE INVENTION

Figure 1:
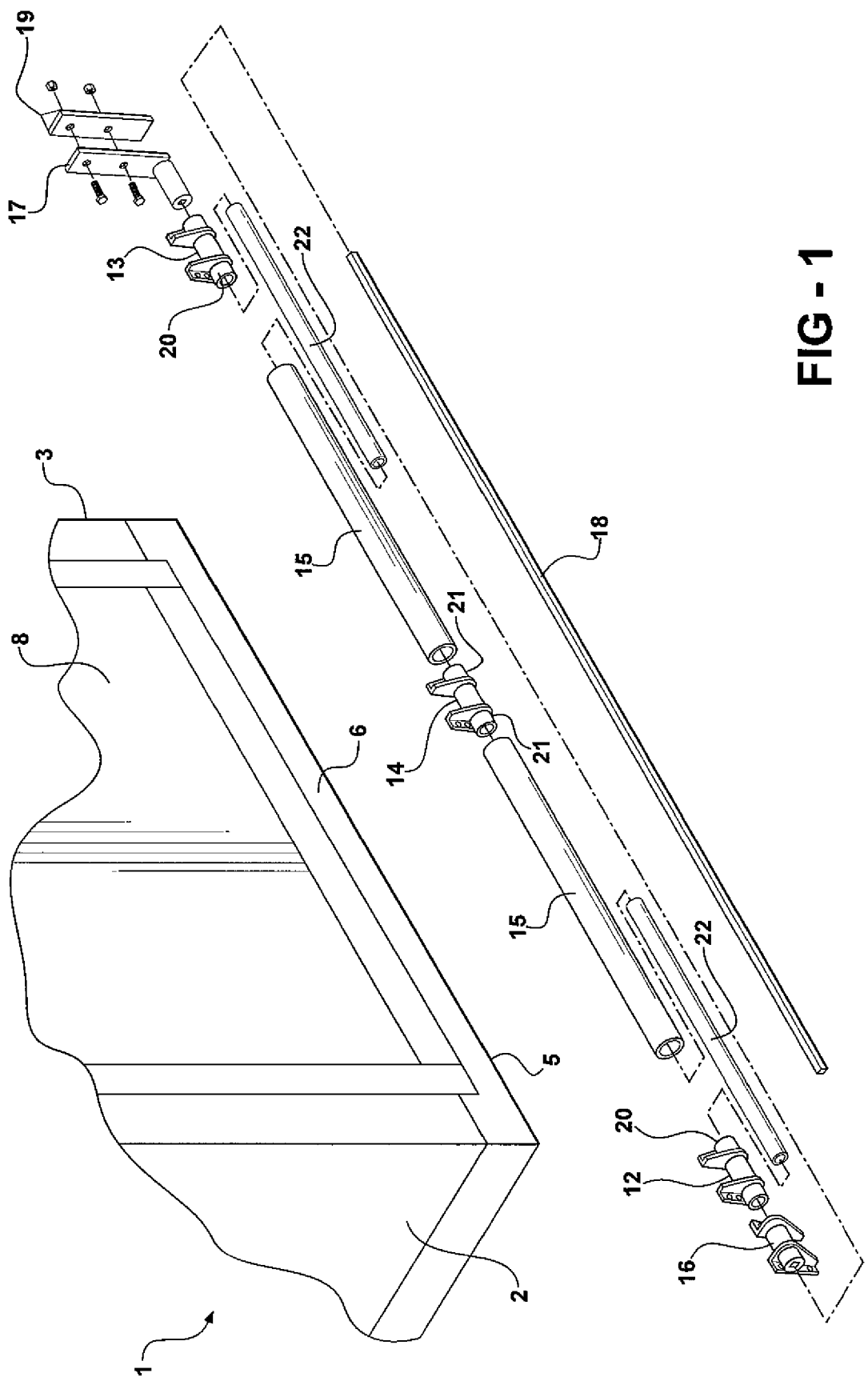
FIG. 1 is a perspective view of the rear of a truck and a perspective exploded view of the lift assist system according to one embodiment that can be attached to the truck to assist in raising the rear door of the truck.

The present invention is directed to lift assist systems for vehicles and trailers that have cargo doors that pivot downward and function as loading/unloading ramps. The term "door ramp" is used herein because the doors of the present invention function both as doors and as ramps. The bottoms of the door ramps are pivotally coupled to a stationary portion of the vehicle or trail so that their upper or free ends can pivot between a closed position and an inclined position in which the free end rests on the ground. The door ramps are secured in their closed positions by any suitable latch or catch mechanism. When in their closed positions, the door ramps function as doors to close, cover or seal the rear opening of a cargo compartment of a vehicle or trailer. When in their inclined positions, the door ramps function as inclined ramps along which one can carry, wheel, push, drive or otherwise transfer various types of cargo into and out of the cargo compartment.

Typically the door ramps are solid, non-hollow panels. However, the door ramps can be hollow composite structures so long as they are sturdy or otherwise reinforced sufficiently to support the weight of cargo while it is loaded and unloaded across the door ramps (in their inclined positions). The door ramps can include any suitable handles, straps, etc. required or desired to manually move the door ramps between their closed and inclined positions. It is also within the scope of the present invention to provide an electric or hydraulic mechanism to move the door ramps between their closed and inclined positions.

The lift assist systems of the present invention are mounted between the body, frame or other solid structure of the vehicles or trailers and the door ramps. The lift systems include a torsion bar having one end that is attached to the door ramp and an opposite end that is attached to the body, frame or other solid structure of the vehicles or trailers. The bottom of the door ramp is pivotally coupled to the body, frame or other solid structure of the vehicle or trailer by two or more hinges through which the pivot axis of the door ramp extends. The torsion bar is position coaxially with the pivot axis of the door ramp and passes through the hinges. As the door ramp is moved from its closed position to its inclined position, the torsion bar is subjected to a twisting force which creates stress within and along the torsion bar. This stress is dissipated as a force that assists in raising the door ramp into its closed position.

The torsion bar extends in a tubular housing that prevents the torsion bar from bowing or bending when twisted and stressed. In addition the tubular housing prevents the torsion bar from being exposed to the environment, including debris, moisture, etc. and from posing a hazard if not covered or shielded in some manner.

During the course of the present invention it was discovered that, due to the fact that most cargo vehicles and trailers are relatively wide, the torsion bars used in the present assist systems of the present invention are required to be of lengths that cause them to be bowed or bent if precautions, such as the tubular housing mentioned above, are not implemented. In addition, the tubular housing itself has to be braced along its length in some fashion as will be understood from the description presented below.

The invention will now be described in detail with reference made to the drawings in which common reference numerals have been used to identify similar elements when practical to simplify the description.

Figure 2:
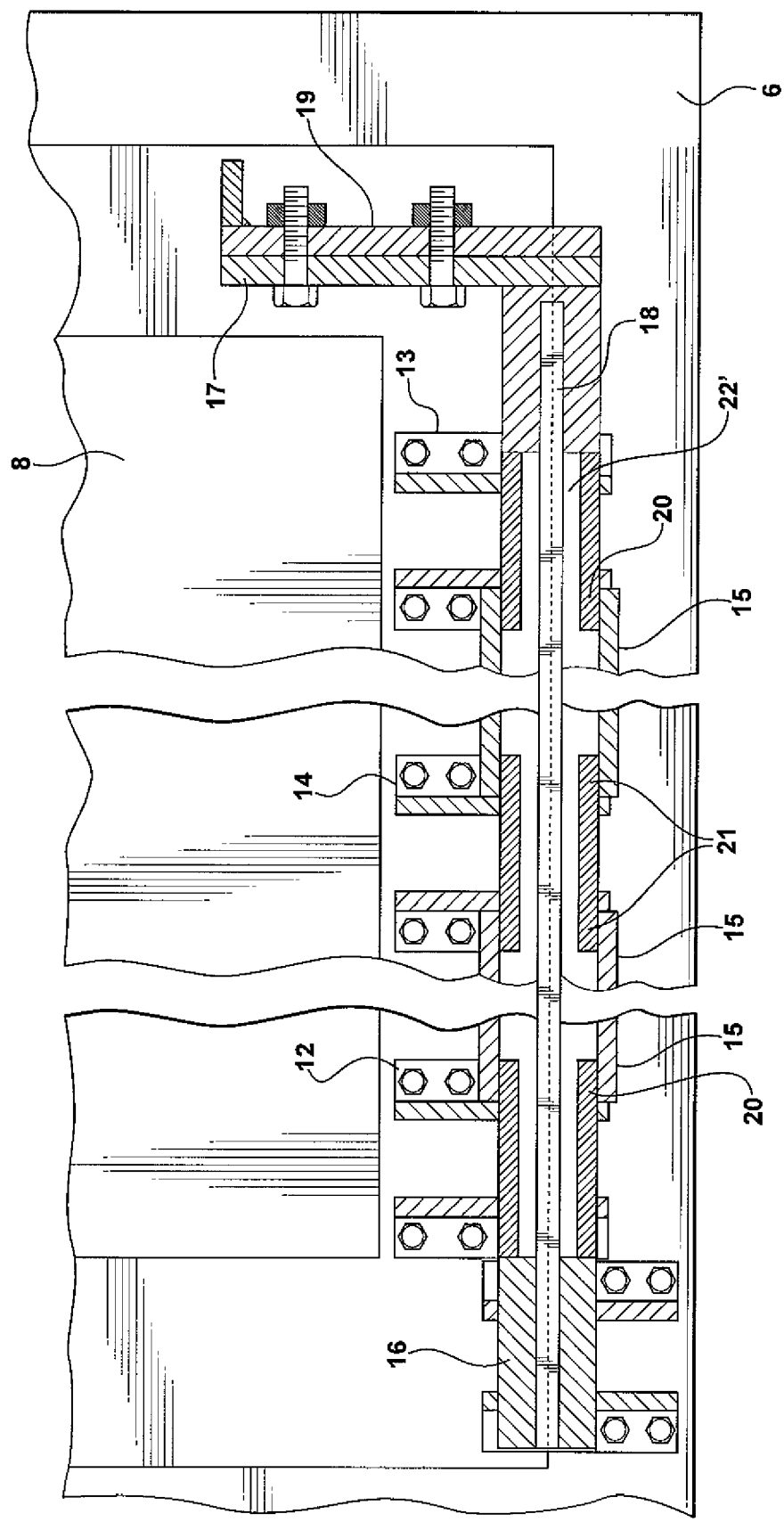
FIG. 2 is a cross-sectional view of the lift assist system of 1.

FIG. 1 is a perspective view of the rear of a truck and a perspective exploded view of the lift assist system according to one embodiment that can be attached to the truck to assist in raising the rear door of the truck. The portion of the truck 1 shown in FIG. 1A includes opposed sides 2 and 3 and a bottom 5 (top 4 is shown in FIG. 2) that is supported by a frame or chassis 6 to which an axle (not shown) having wheels 7 (See FIG. 2) is coupled in a conventional manner. A rear door or door ramp 8 is shown in its closed position at the rear of the truck 1 in FIG. 1. As shown, the door ramp 8 extends horizontally between the opposed sides 2 and 3 and, as shown in FIG. 2, vertically between the top 4 and bottom 5 of the rear of the truck 1. It is noted that a similar door ramp 8 could be provided for a trailer rather than a truck according to the present invention. In use, the door ramp 8 is pivotally coupled to the frame or chassis 6 of the truck 1 by the lift assist system of the present invention so that the door ramp 8 can pivot between the closed position depicted in FIG. 1 and an open or ramp position (See FIG. 6) in which the top 10 (See FIG. 3) of the door ramp 8 rests on the ground and the door ramp 8 extend at an inclined angle downward from the frame or chassis 6 at the rear of the truck 1.

The door ramp 8 can be a solid panel that can be made from any suitably strong material, including wood, metals, composites, laminates, etc. Alternatively, the door ramp 8 can be a hollow structure or hollow composite structure. In either case the door ramp 8 can be reinforced externally or internally to support the weight of cargo while it is loaded and unloaded across the door ramp 8. For example, a support frame can extend at least around the periphery of the door ramp 8. FIG. 2 depicts a pair of handles 11 on the upper sides of the door ramp 8. It is to be understood that the door ramp 8 can include any suitable handles, straps, etc. required or desired to manually move the door ramp 8 between its closed and inclined ramp positions.

When assembled, the visible elements of the lift assist system include left door hinge 12, right door hinge 13 and center door hinge 14, with tubular housing portions (also referred to as frame tubes) 15 extending between the left door hinge 12 and the center door hinge 14 and between the right door hinge 13 and the center door hinge 14. Also visible when the lift assist system is assembled is the torsion bar stop 16 that can is attached to the frame or chassis 6 of truck 1 and the torsion arm 17 that is used to couple the torsion bar 18 to the bottom of door ramp 8. The torsion arm 17 shown in FIG. 1 is configured to be bolted to the lower edge of the door ramp 8 using a door mounting bracket 19. It is noted that the elements that are to be attached to the door, including the left door hinge 12, right door hinge 13, center door hinge 14 and door mounting bracket 19 can be welded or bolted to the door ramp 8 or attached firmly thereto in any convenient manner. Likewise the stop bar 16 can be welded or bolted to the frame or chassis 6 or attached firmly thereto in any convenient manner. Further, the housing portions or frame tubes 15 which can have mounting brackets similar to the mounting brackets 31 provided on frame mounts 29 (discussed below) can be bolted or welded to the frame or chassis 6 or attached only thereto in any convenient manner. Alternatively, the frame tubes 15 can be welded directly onto the frame or chassis 6.

As shown in FIG. 1, the left and right door hinges 12 and 13 have inward extending portions 20 which are configured to be received in the ends of the frame tubes 15. Likewise, the center door hinge 14 has outward extending portions 21 on either side that are configured to be received in the ends of the frame tubes 15. Bracing tubular members 22, through which the torsion bar 18 extends are provided in frame tubes 15. During the course of the present invention, the inventor has discovered that the torsion bar 18 can be subjected to bending while under a twisting stress. Accordingly, the bracing tubular members 22 prevent the torsion bar 18 from bending and potentially breaking. Alternatively to using bracing tubular members 22, the wall thickness of the frame tubes 15 could be increased to reduce any free spaced between the torsion bar 18 and inner surface of the frame tubes 15. The bracing tubular members 22 are received in frame tubes 15 and abut the extending portions 20 on the left and right door hinge 12 and 13 and the extending portions 21 on the center door hinge 14.

As can be understood, the pivot axis of the door ramp 8 is coaxial with the pivot axes of the door hinges 12, 13 and 14 when the lift assist system is attached to the truck.

The torsion bar 18 can have a circular, square or polygonal cross section along its length as long as the ends are configured in some manner to be fixed against rotational movement in the torsion bar stop 16 and the torsion arm 17 each of which includes a complimentarily shaped bore or through-hole to receive the ends of the torsion bar 18. For example, the entire length of the torsion bar 18 can have a square cross sectional shape. Alternatively, the entire length of the torsion bar 18 can have a circular cross sectional shape except the ends which can have square cross sectional shapes. Other end cross sectional shapes which allow the ends of the torsion bar 18 to be held or fixed against rotational movement can be used.

FIG. 2 is a cross-sectional view of the lift assist system of 1. FIG. 2 shows how the inward extending portions 20 of the left and right door hinges 12 and 14 are configured to be received in the ends of the frame tubes 15. FIG. 2 further shows how the outward extending portions 21 of the center door hinge 13 are configured to be received in the ends of the frame tubes 15. The bracing tubular members 22 shown in FIG. 1 are not included in FIG. 2 in order to simplify FIG. 2. However, it is noted that the bracing tubular members 22 would be received in the space identified by reference numeral 22' in FIG. 2. FIG. 2 also shows how the door hinges 12, 13 and 14 are bolted (in this embodiment) to the door ramp 8 and how the torsion bar stop 16 is bolted (in this embodiment) to the frame or chassis.

Figure 3:
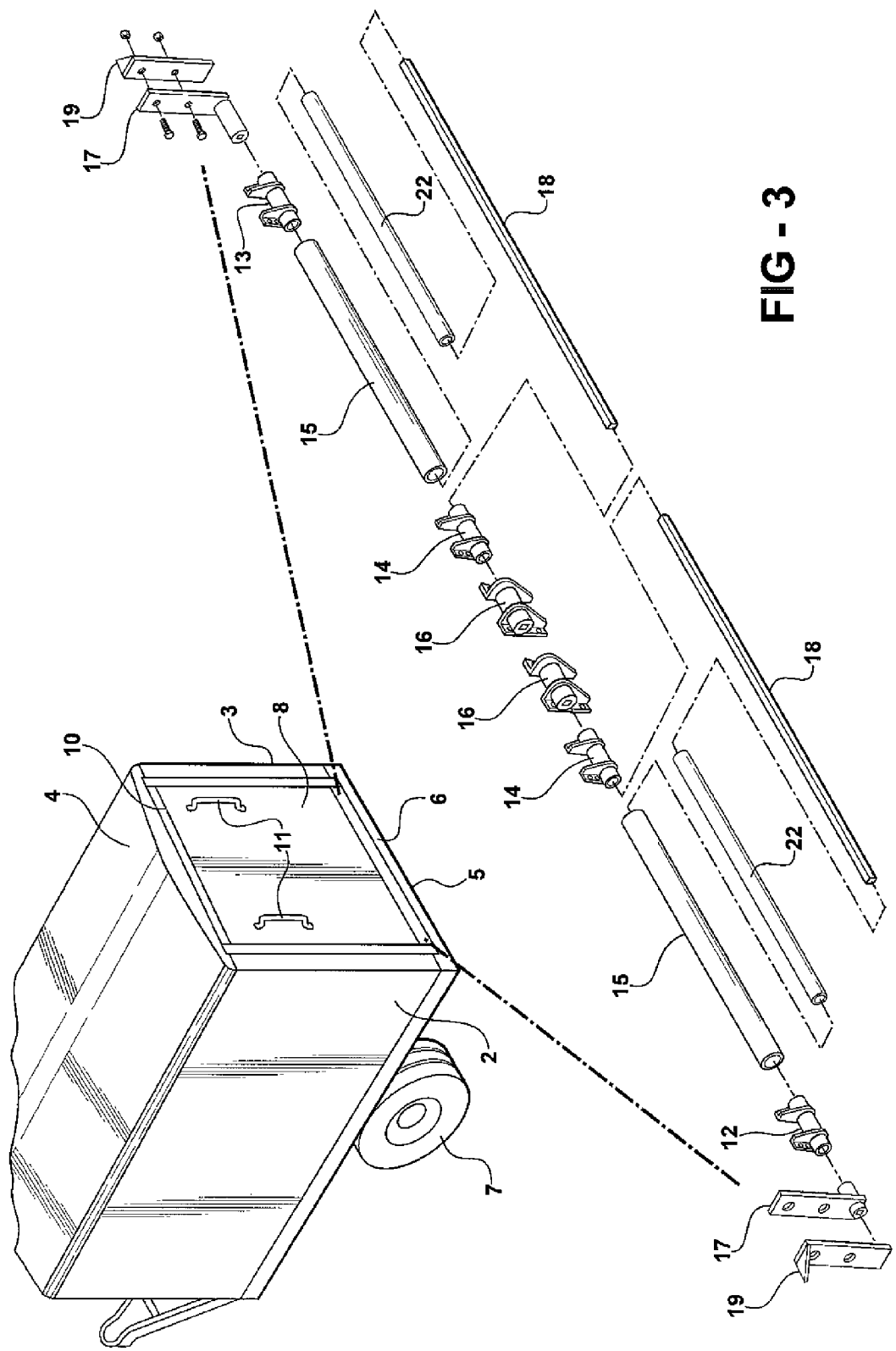
FIG. 3 is a perspective view of the rear of a truck and a perspective exploded view of the lift assist system according to another embodiment that can be attached to the truck to assist in raising the rear door of the truck.

FIG. 3 is a perspective view of the rear of a truck and a perspective exploded view of the lift assist system according to another embodiment that can be attached to the truck to assist in raising the rear door of the truck. The lift assist system depicted in FIG. 3 includes two torsion bars 18 each of which have ends that are coupled to centrally located torsion bar stops 16 that are fixed to the frame or chassis 6 and opposite ends that are coupled to torsion arms 17 that are coupled to either side of the door ramp 8. The torsion bar stops 16 and the torsion arms 17 include bores or through-holes that are complimentarily shaped to the ends of the torsion bar 18 which are received therein so as to prevent relative rotational movement. In the embodiment of FIG. 3 there are left and right door hinges 12 and 13 and two center door hinges 14 each of which can be attached to the door ramp 8 by suitable mechanical fasteners such as bolts or otherwise can be welded thereto or attached in any suitable manner. The torsion bar stops 16 are likewise attached to the frame or chassis 6 by suitable mechanical fasteners such as bolts or otherwise can be welded thereto or attached in any suitable manner. Further, the frame tubes 15 which can have mounting brackets similar to the mounting brackets 31 provided on frame mounts 29 (discussed below) can be bolted or welded to the frame or chassis 6 or attached firmly thereto in any convenient manner. The center door hinges 14 have extending portions 21 that are received in frame tubes 15 an extending portions 21' that are received in center door hinges 14. The lift assist system shown in FIG. 3 also includes bracing tubular members 22 that are received in frame tubes 15 and abut the extending portions 20 on the left and right door hinge 12 and 13 and the extending portions 21 on the center door hinges 14.

Figure 4:
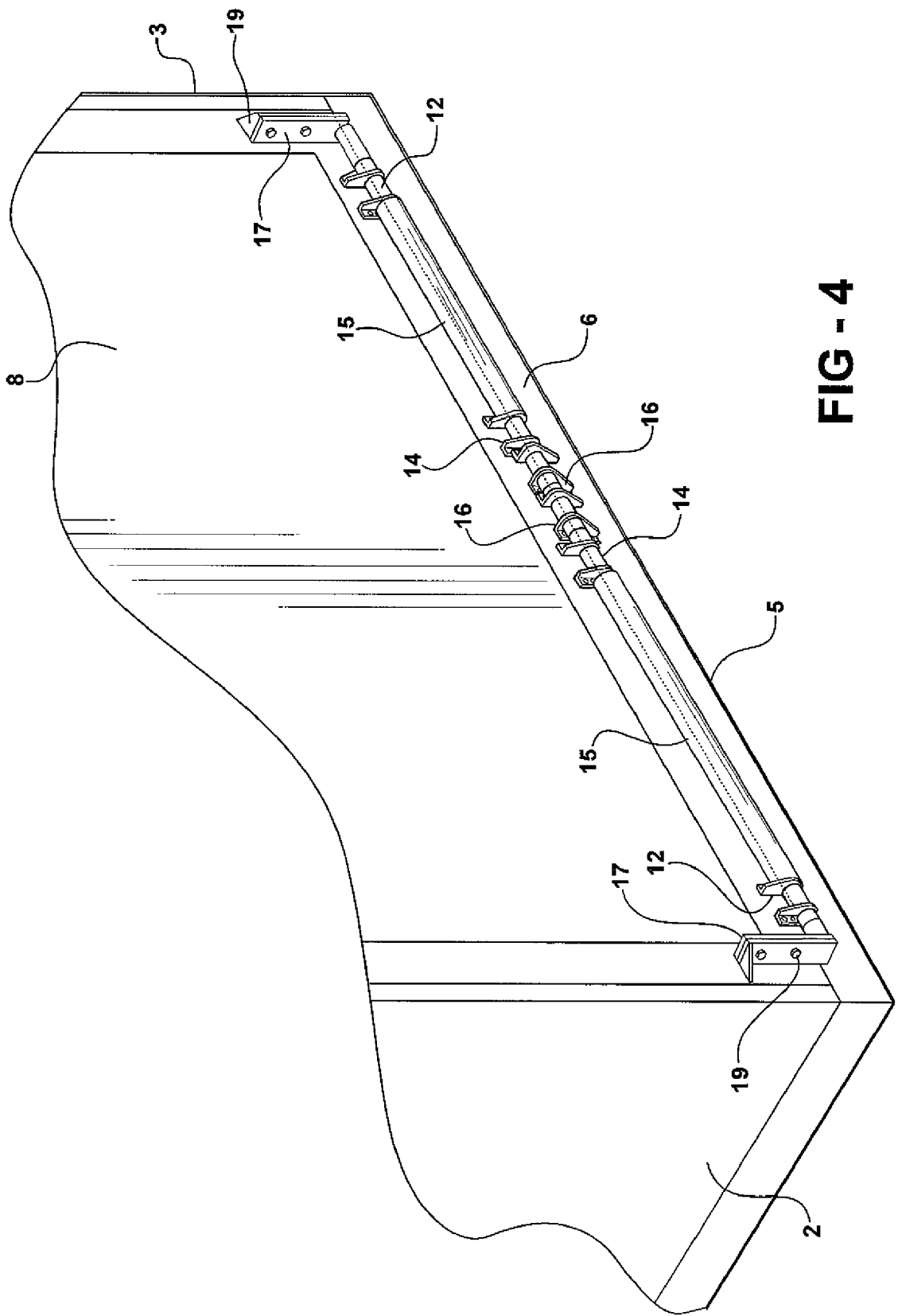
FIG. 4 is a perspective view of the rear of a truck with the lift assist system of FIG. 3 attached to the truck to assist in raising the rear door of the truck.

FIG. 4 is a perspective view of the rear of a truck with the lift assist system of FIG. 3 attached to the truck to assist in raising the rear door of the truck. As shown, the lift assist system is attached (by the hinges 12, 13 and 14) to door ramp 8 and by torsion bar stops to frame or chassis 6 of truck 1 below the door ramp 8. The inner ends of the two torsion bars 18 are coupled to centrally located bar stops 16 that are fixed to the frame or chassis 6 and opposite outer ends of the two torsion bars 18 are coupled to torsion arms 17 that are coupled to either side of the door ramp 8.

In the embodiment of the lift assist system shown in FIG. 1, the bar stop 16 would be fixed to the frame or chassis 6 and the torsion bar 18 would be coupled to torsion arm 17 that would be coupled to the opposite side of the door ramp 8 as indicated in FIG. 2.

Figure 6:
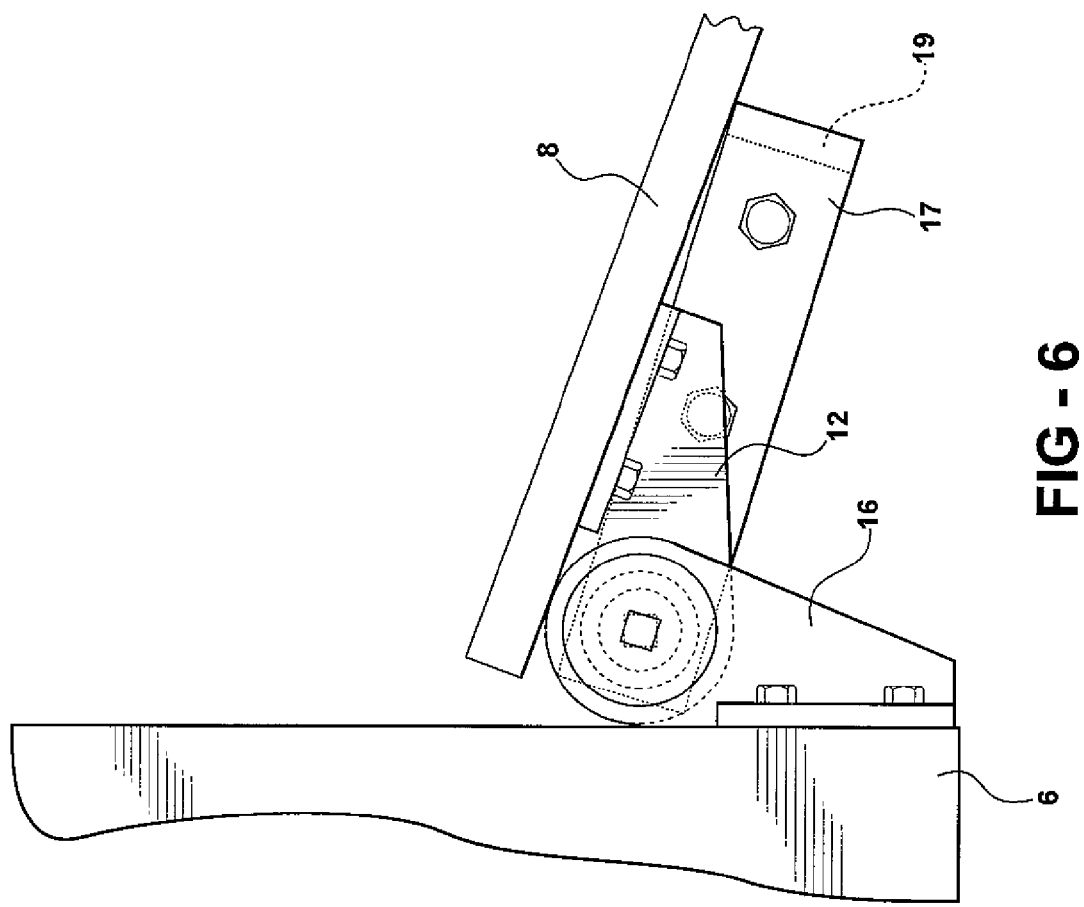
FIG. 6 is a partial side view of a lift assist system of the present invention attached to the rear of a truck with the rear door of the truck in an open position.
Figure 5:
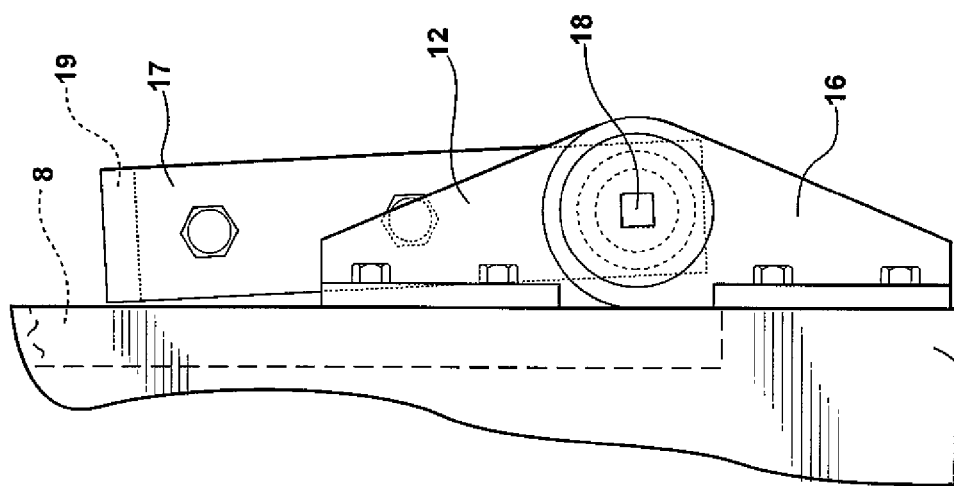
FIG. 5 is a partial side view of a lift assist system of the present invention attached to the rear of a truck with the rear door of the truck in a closed position.

FIG. 5 is a partial side view of a lift assist system of the present invention attached to the rear of a truck with the rear door of the truck in a closed position. FIG. 6 is a partial side view of a lift assist system of the present invention attached to the rear of a truck with the rear door of the truck in an open position. In FIGS. 5 and 6 the torsion bar 18 is shown as being positioned to coincide with the pivot axis of the door ramp 8. The torsion bar 18 is coupled to the door ramp 8 at one end by torsion arm 17 and extends through hinge 13 that is coupled to door ramp 8. The end of the torsion bar 18 which is opposite to the end that is coupled to door ramp 8 is attached to the frame or chassis of a truck by bar stop 16. In the position depicted in FIG. 6, the free or top end of door ramp 8 would be pivoted clockwise sufficiently so that the free or top end would rest on the ground and the door ramp could be used as a ramp to load or unload the truck.

Figure 7:
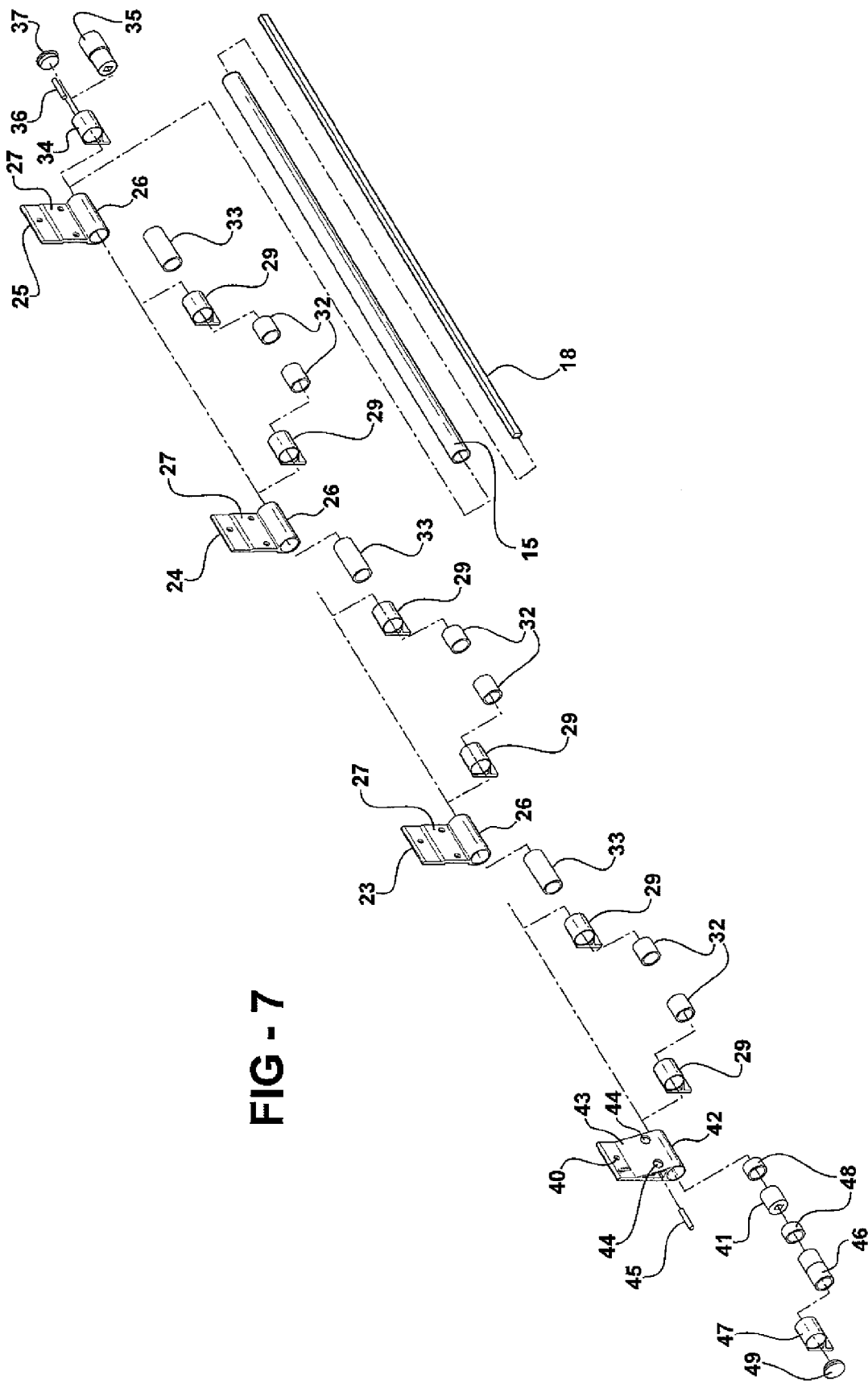
FIG. 7 is perspective exploded view of a life assist system according to another embodiment of the present invention.
Figure 8:
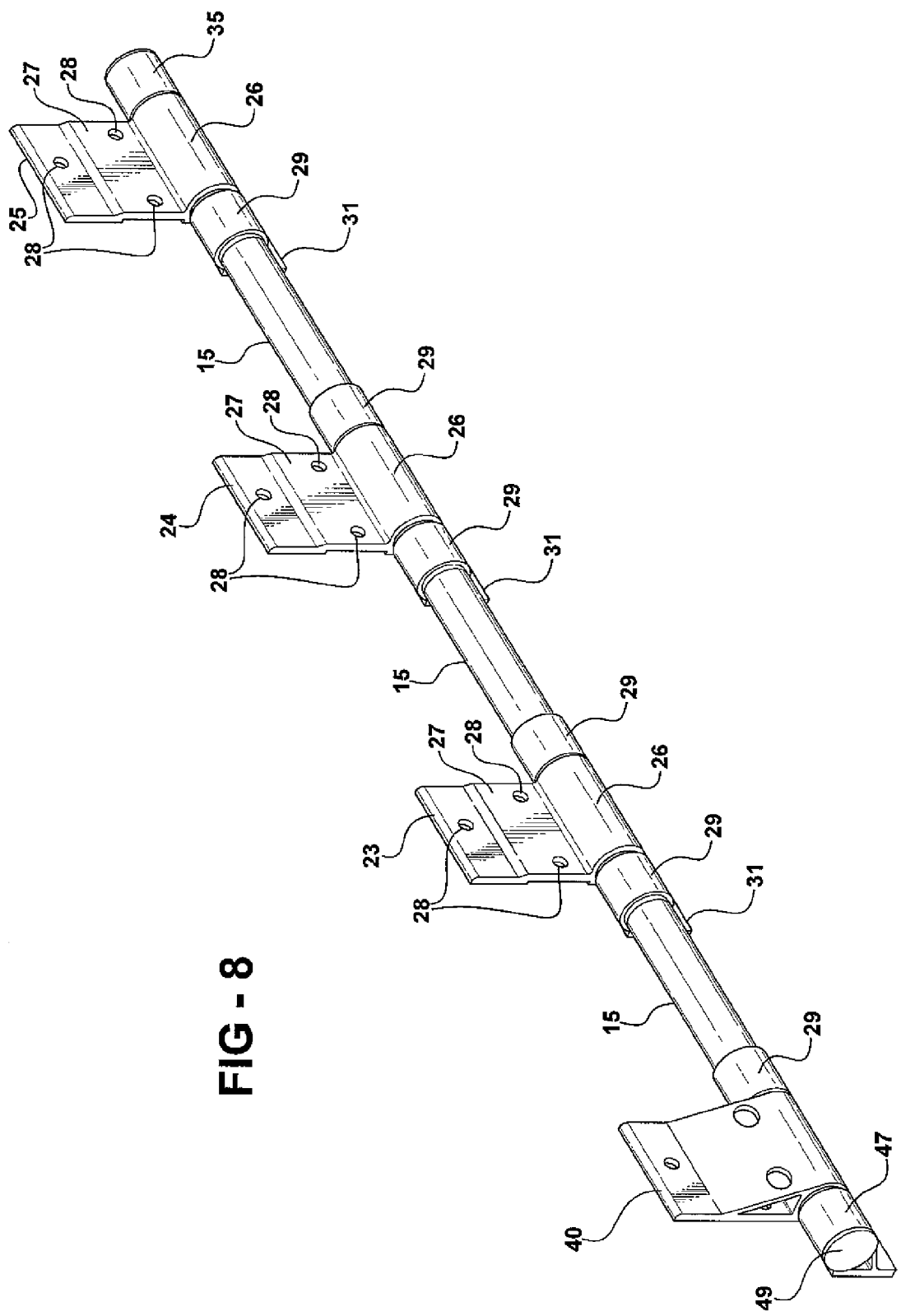
FIG. 8 is a perspective view of the lift assist system of FIG. 7 assembled.

FIG. 7 is perspective exploded view of a life assist system according to another embodiment of the present invention. FIG. 8 is a perspective view of the lift assist system of FIG. 7 assembled. The lift assist system of FIGS. 7 and 8 includes a left door support 23, a right door support 24 and a center door support 25 which are configured to be attached to the bottom of a door ramp and receive a torsion bar 18 (and frame tube 15) there through. In this regard, the door supports 23, 24 and 25 each have a tubular portion 26 and a mounting plate 27. As shown, the mounting plates 27 can be provided with though-holes 28 by which they can be secured to a door ramp by mechanical fasteners such as bolts or screws. Alternatively, the mounting plates 27 can be welded to the door ramp or attached firmly thereto in any convenient manner.

The tubular portions 26 of the door supports 23, 24 and 25 are positioned adjacent frame mounts 29 which comprise tubular members that have mounting brackets 31 attached thereto for mounting the frame mounts 29 to the frame or chassis of a truck below the door ramp. The mounting brackets 31 of the frame mounts 29 can be provided with though-holes (not shown) by which they can be secured to the frame or chassis by mechanical fasteners such as bolts or screws. Alternatively, the frame mounts 29 can be welded to the frame or chassis or attached firmly thereto in any convenient manner.

Bearings 32 are provided that are received within the frame mounts 29. In addition, bearings 33 are provided that are received within the door supports 23, 24 and 25. Bearings 32 and 33 can be made from a suitable plastic material or any conventional bearing material.

A frame tube 15 extends through each of the door supports 23, 24 and 25 and frame mounts 29 and within bearings 32 and 33 so that frame tube 15 can rotate within the door supports 23, 24 and 25 and frame mounts 29. A torsion bar 18 extends through the frame tube 15 and has one end that is fixed with respect to the door ramp against relative rotational movement and another end that is fixed with respect to the frame or chassis against relative rotational movement.

The end of the torsion bar 18 that is fixed with respect to the frame or chassis passes through stop bar mount 34 and is received in frame bar stop 35. Stop bar mount 34 comprises a tubular member having a mounting bracket (similar to frame mounts 29) that can be secured to the frame or chassis by mechanical fasteners such as bolts or screws. Alternatively, the stop bar mount 34 can be welded to the frame or chassis or attached firmly thereto in any convenient manner. Frame bar stop 35 includes a center through-hole or bore that has a cross-sectional shape, e.g. square, that is configured to receive the end of tensional bar 18. The stop bar mount 34 and the frame bar stop 35 are each keyed to receive a key stock 36 that prevents relative rotational movement of the frame bar stop 35 with respect to the stop bar mount 34. In this manner, the end of torsion bar 18 is fixed with respect to the frame or chassis against relative rotational movement. An end cap 37 is shown as being received in frame bar stop 35.

The end of the torsion bar 18 that is fixed with respect to the door ramp passes through door support 40 and is received in door bar stop 41. The door support 40 includes a tubular portion 42 and a reinforced mounting bracket 43. As shown, the mounting bracket 43 can be provided with though-holes 44 by which they can be secured to a door ramp by mechanical fasteners such as bolts or screws. Alternatively, the mounting bracket 43 can be welded to the door ramp or attached firmly thereto in any convenient manner. The door bar stop 41 includes a center through-hole or bore that has a cross-sectional shape, e.g. square, that is configured to receive the end of tensional bar 18. The door support 40 and the door bar stop 41 are each keyed to receive a key stock 45 that prevents relative rotational movement of the door bar stop 41 with respect to the door support 40. In this manner, the end of torsion bar 18 is fixed with respect to the door ramp against relative rotational movement. A support shaft 46 is received partially within door support 40 and frame mount 47 within bearings 48. Frame mount 47 is similar to frame mounts 29 discussed above and is mounted to the frame or chassis as discussed above. Support shaft 46 can be a solid or hollow tubular member that is used to hold door bar stop 41 within door support 40. Bearings 48 can be made from any suitable bearing material including plastic bearing materials as discussed above with reference to bearings 32 and 33. An end cap 49 is shown as being received in frame mount 47.

As discussed above, the torsion bar 18 can have a circular, square or polygonal cross section along its length as long as the ends are configured in some manner to be fixed against rotational movement in the frame bar stop 35 and the door stop bar 41. For example, the entire length of the torsion bar 18 can have a square cross sectional shape. Alternatively, the entire length of the torsion bar 18 can have a circular cross sectional shape except the ends which can have square cross sectional shapes. Other end cross sectional shapes which allow the ends of the torsion bar 18 to be held or fixed against rotational movement can be used.

It is also noted that while a total of four door supports are depicted in FIGS. 7 and 8, three or more than four door supports could be used in further embodiments of the invention.

FIG. 8 shows how the frame mounts 29 and 47 are positioned adjacent the door supports 25 and 40 with a slight gap therebetween so as to allow for relative rotation between the frame mounts 29 and the door support 25. FIG. 8 also depicts a mounting bracket 27 on the back of one of the frame mounts 29 and a portion of frame tube 15 and more detail of the mounting bracket 43 on the back of one of the frame mounts 47.

In the embodiment of the invention depicted in FIGS. 7 and 8 the tubular portions 26 and 42 of the door supports 23-25 and 40 with the frame tube 15 passing there through function similarly as the hinges in the embodiment of the invention depicted in FIGS. 1-4. In the embodiment of the invention depicted in FIGS. 1-4 the door ramp 8 and have a separate Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above.

What is claimed is:

1. A lift assist system for a cargo door ramp that comprises:
   at least one torsion bar that has one end fixed against axial rotation relative to the door ramp and an opposite end fixed against axial rotation relative to a structure about which the door ramp pivots between an open and closed position;
   a plurality of door hinges including at least left and right door hinges and at least one center door hinge; and
   a tubular housing extending between the door hinges through which the at least one torsion bar extends,
   wherein the one end and the opposite end of the at least one torsion bar each have cross-sectional shapes that are complimentarily shaped so as to mate with and be received in a bore or through-hole provided in a structural element that fixes the one end of the at least one torsion bar to a door ramp and in a bore or through-hole that fixes the opposite end of the at least one torsion bar to a structure adjacent to the door ramp whereby when the one end and the opposite end of the at least one torsion bar are received in the bores or through-holes the one end of the at least one torsion cannot be rotated with respect to the structural element and the opposite end of the at least one torsion bar cannot be rotated with respect to said structure adjacent to the door ramp.

2. A lift assist system for a cargo door ramp according to claim 1, wherein the tubular housing comprises two frame tubes.

3. A lift assist system for a cargo door ramp according to claim 1, wherein the at least one torsion bar comprises two torsion bars and the at least one center door hinge comprises two center door hinges.

4. A lift assist system for a cargo door ramp according to claim 1, wherein the door ramp comprises a vehicle door.

5. A lift assist system for a cargo door ramp according to claim 1, wherein the door ramp comprises a trailer door.

6. A lift assist system for a cargo door ramp according to claim 1, wherein the plurality of door hinges comprise a plurality of door supports that include tubular portions and mounting plates and the tubular housing extends through the tubular portions of the door supports.

7. A lift assist system for a cargo door ramp according to claim 6, wherein the plurality of door supports comprises door supports on opposite ends of the lift assist system and at least one intermediate door support that is positioned between frame mounts through which the tubular housing extends.

8. A lift assist system for a cargo door ramp according to claim 7, further comprising tubular bearings located between the tubular housing and the plurality of door supports and between the tubular housing and the frame mounts.

9. A lift assist system for a cargo door ramp according to claim 6, further comprising tubular bearings located between the tubular housing and the plurality of door supports.

10. A lift assist system for a cargo door ramp according to claim 1, further comprising bracing tubes that are located between the tubular housing and the torsion bar.

11. A vehicle having a door that pivots adjacent a frame downward into an open position and upward into a closed position in combination with a lift assist system which combination comprises:
   at least one torsion bar that has one end fixed against axial rotation relative to the door ramp and an opposite end fixed against axial rotation relative to a portion of the frame adjacent which the door pivots between the open and closed positions;
   a plurality of door hinges attached to the door, including at least left and right door hinges and at least one center door hinge; and
   a tubular housing extending between the door hinges through which the at least one torsion bar extends, the tubular housing being attached to the frame,
   wherein the one end and the opposite end of the at least one torsion bar each have cross-sectional shapes that are complimentarily shaped so as to mate with and be received in a bore or through-hole provided in a structural element that fixes the one end of the at least one torsion bar to a door ramp and in a bore or through-hole that fixes the opposite end of the at least one torsion bar to a structure adjacent to the door ramp whereby when the one end and the opposite end of the at least one torsion bar are received in the bores or through-holes the one end of the at least one torsion cannot be rotated with respect to the structural element and the opposite end of the at least one torsion bar cannot be rotated with respect to said structure adjacent to the door ramp.

12. The combination of claim 11, wherein the tubular housing comprises two frame tubes.

13. The combination of claim 11, further comprising a tension bar stop secured to the frame into which the opposite end of the torsion bar is received.

14. The combination of claim 11, wherein the at least one torsion bar comprises two torsion bars and the at least one center door hinge comprises two center door hinges.

15. The combination of claim 14, further comprising a pair of tension bar stops secured to the frame between the two tension bars into which the opposite ends of the tension bars are received.

16. The combination of claim 11, wherein the vehicle comprises a motorized vehicle.

17. The combination of claim 11, wherein the vehicle comprises a non-motorized towed vehicle.

18. The combination of claim 11, wherein the plurality of door hinges comprise a plurality of door supports that include tubular portions and mounting plates and the tubular housing extends through the tubular portions of the door supports.

19. The combination of claim 18, wherein the plurality of door supports comprises door supports on opposite ends of the lift assist system and at least one intermediate door support that is positioned between frame mounts through which the tubular housing extends.

20. The combination of claim 18, further comprising tubular bearings located between the tubular housing and the plurality of door supports.

* * * * *